Aug. 9, 1966  F. A. KANE III  3,265,388
RHYTHMIC AERATOR ACTUATED FLOAT FOR INDICATING WATER LEVEL
Filed Sept. 19, 1963  3 Sheets-Sheet 1
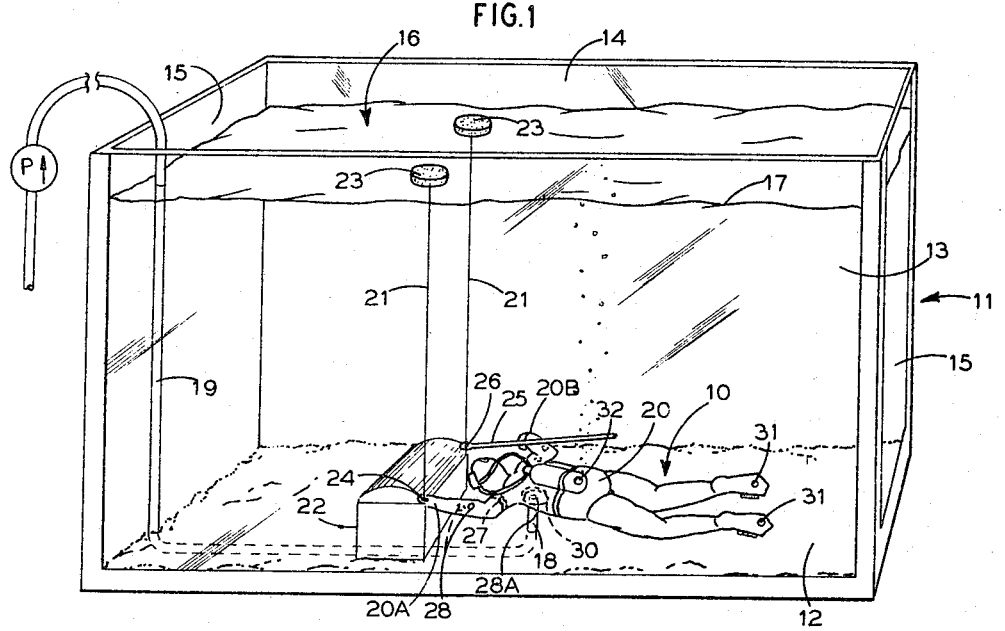
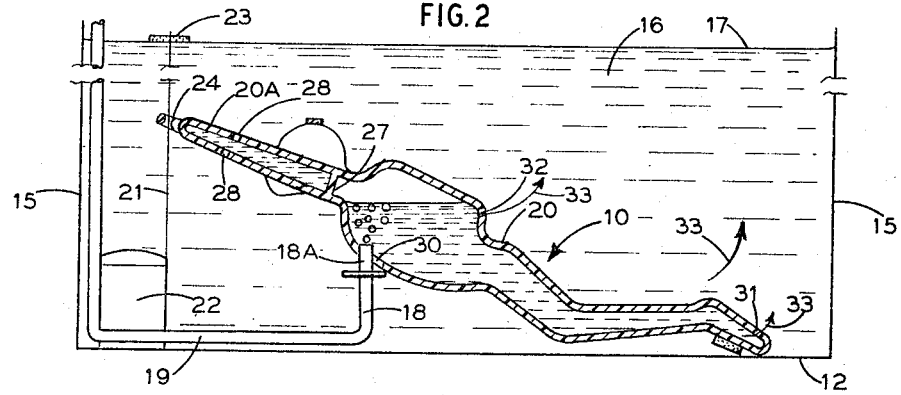
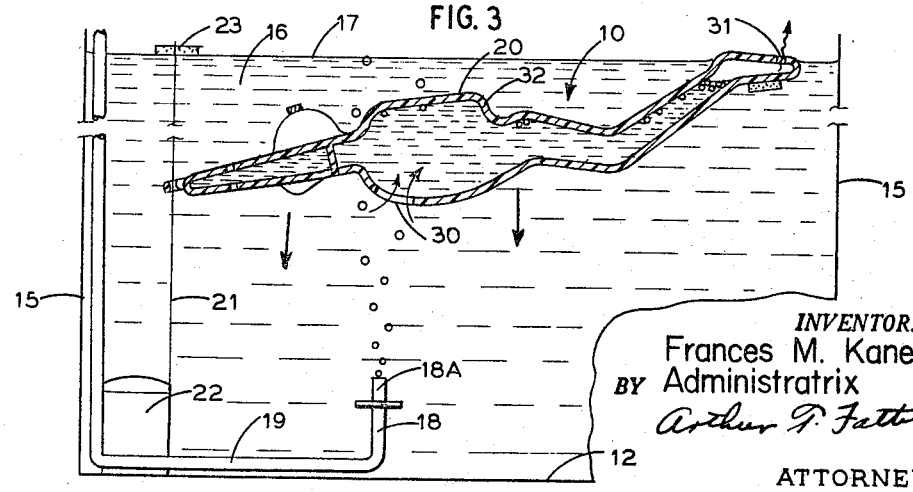
INVENTOR.
Frances M. Kane
BY Administratrix
Arthur F. Fattibene
ATTORNEY Aug. 9, 1966  F. A. KANE III  3,265,388
RHYTHMIC AERATOR ACTUATED FLOAT FOR INDICATING WATER LEVEL
Filed Sept. 19, 1963  3 Sheets-Sheet 2

INVENTOR.
Frances M. Kane,
BY Administratrix
Arthur F. Fattibene
ATTORNEY

Aug. 9, 1966    F. A. KANE III    3,265,388
RHYTHMIC AERATOR ACTUATED FLOAT FOR INDICATING WATER LEVEL
Filed Sept. 19, 1963    3 Sheets-Sheet 3

INVENTOR.
Frances M. Kane
BY    ADMINISTRATRIX

*Arthur F. Fathbone*
ATTORNEY

United States Patent Office

3,265,388
Patented August 9, 1966

3,265,388
RHYTHMIC AERATOR ACTUATED FLOAT FOR INDICATING WATER LEVEL
Frank A. Kane III, deceased, late of Stratford, Conn., by Mrs. Frank A. Kane, Jr., administratrix, 18 Fairlea Ave., Stratford, Conn.
Filed Sept. 19, 1963, Ser. No. 310,171
13 Claims. (Cl. 272—8)

This invention relates in general to a novelty aquatic device, and more specifically to an aquatic device constructed and arranged to rise and sink in a body of water in a continuous rhythmic fashion.

Heretofore, known aquatic devices employed to rise and sink in a body of water, as evidenced by Patents 2,525,232 and 3,077,697 operated on a cartesian principle, that is, simulated aquatic figures made to rise and sink in a liquid filled chamber by varying the pressure of the liquid. Such devices, however, had no practical utility except as a novelty toy for intriguing children. Such cartesian devices required a closed liquid filled chamber for their operation. For this reason cartesian devices are not applicable for use in aquariums.

Other aquatic devices constructed to rise and sink in a body of water as evidenced by U.S. Patent 2,932,916 operated on the principle of a chemical reaction. Such chemically operated devices comprise a hollow body containing a gas generating substance which, upon the reaction with water, generates a gas which renders the body buoyant, whereupon the body would rise in a body of liquid. Apertures formed in the body would, upon the surfacing, exhaust the gas generated, the escaped gas being replaced by water causing the device to again submerge. Consequently, in chemical reaction devices, the operation of such devices is rendered effective only as long as there is a sufficient amount of gas generating material present. Upon exhaustion of the gas generating substance, the operation of the device ceases, and the device rendered useless until recharged.

Therefore, it is an object of this invention to provide an aquatic device which is constructed and arranged to rise and sink in a body of liquid independently of the water pressure of the surrounding liquid.

It is another object to provide an aquatic device arranged to rise and sink in a body of liquid independently of any chemical reaction.

It is another object of this invention to provide an unattached, pneumatically operated aquatic device which can rise and sink in a body of liquid.

It is another object of this invention to provide an aquatic device which is free to rise and sink in a rhythmic fashion and in a continuous manner.

It is another object to provide an aquatic device which is particularly adapted for use in aquariums.

It is still another object to provide a novel aquatic device which is free to rise and sink in a body of water and which is capable of gauging a controlled water level by ceasing to operate in the event the level of the water falls below a predetermined level.

It is another object to provide an improved aquatic device arranged to rise and sink in a continuous rhythmic fashion which is relatively simple in operation, inexpensive to fabricate, and positive in operation.

It is another object of this invention to provide an improved aquatic device which is readily adapted to operate in an aquarium having an aerating means.

Still another object of this invention is to provide an aquatic device that will rise and sink in a body of water in a proper simulated diving or surfacing attitude.

Another object of this invention is to provide an aquatic device in which the timing of the rising and sinking thereof in a body of liquid can be regulated.

In accordance with this invention, the foregoing objects and other features and advantages are attained by an aquatic device comprising essentially of guide means anchored in a body of water in a vertically taut position. A means in the form of a hollow body shaped to simulate a desired underwater object, animal or theme is arranged to rise and sink along the guide means in a regular rhythmic fashion. Essentially the hollow body is provided with an inlet opening formed in the undersurface thereof and at least one or more exhaust ports formed in spaced relationship therefrom. The arrangement is such that the inlet opening formed in the undersurface of the body is arranged so as to be disposed over a nozzle of an aerator generally employed in an aquarium or the like for supplying oxygen to the water. The arrangement is such that the guide lines are disposed adjacent the aerator with the body arranged to be movably connected therealong. In operation, air is introduced through the inlet opening into the hollow portion of the body. The air so introduced is trapped in a portion of the body and displaces the water therein, the displaced water being exhausted through the exhaust ports formed in the body. When a sufficient amount of air has been introduced into the body, the body becomes buoyant, and will begin to rise in a simulated rising or surfacing attitude along the guide means. Upon surfacing, water is taken in through the inlet opening to effectively displace the air therein which had made the body buoyant. The water taken in to displace the air therein functions as a ballast to sink the body. In doing so, the body will assume a natural diving attitude. The guide lines in turn direct the body to the bottom of the body of liquid so that the inlet opening is again disposed over the nozzle of an aerator. As the nozzle is discharging air continuously, the air is again introduced into the body to displace the ballast liquid therein, thereby causing the body to become buoyant again. Thus, the cycle is repeated continuously as long as the air pump, which supplies the aerator, is operating.

In another form of the invention, a holding means is provided to maintain the body, which has been rendered buoyant, by air, submerged until an actuator means, which effects release of the holding means, is rendered operative. Accordingly the timing of the cycle of operation can be controlled. In this form of the invention, the actuating means is timed to operate after the body has been rendered buoyant. The arrangement is such that the body is rendered buoyant prior to the operation of the actuating means so that upon the release of the holding means, the body will immediately rise.

A feature of this invention resides in the provision of the utilization of vertically taut guide lines for controlling the rising and sinking of the body in a prescribed path.

It is another feature which resides in that the device functions as a water level indicator, i.e., any change in water level below that which is desired causes the guide lines to slacken and thereby render ineffective the rising and falling of the body in the liquid.

Still another feature resides in the provision in that the rising and the falling of the aquatic body in a body of water is continuously automatic as long as the aerator is operated.

Another feature resides in that the aquatic device can be readily adapted to any aquarium provided with an aerating means.

Other features and advantages become more readily apparent when considered in view of the drawings and the specification in which, FIGURE 1 is a perspective view illustrating the improved aquatic device of this invention as applied to an aquarium adapted to contain fishes or the like.

FIGURE 2 is an enlarged side view of the device shown in section illustrating the position of the body immediately prior to its being rendered buoyant.

FIGURE 3 illustrates a side view of the aquatic device shown in section as it has surfaced and is about to make its descent.

Figure 4:
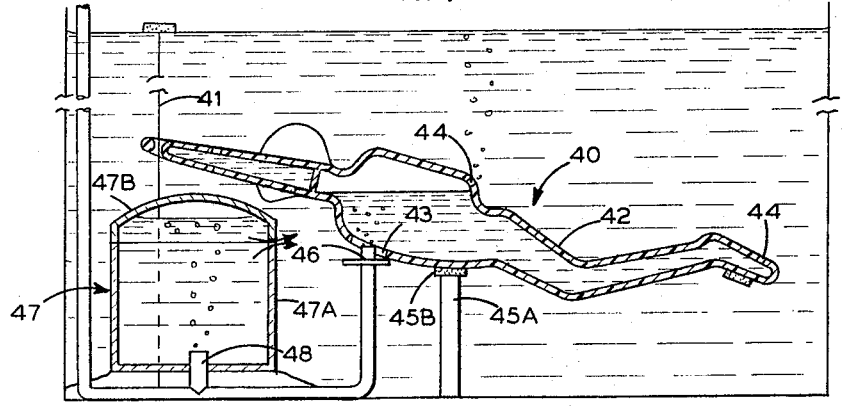
FIGURE 4 is a sectional side view of a modified form of the embodiment.

Referring to the drawings, and more specifically to FIGS. 1 to 3, there is shown the aquatic device 10 constructed in accordance with this invention and as applied to an aquarium 11. As shown, the aquarium 11 comprises a conventional open tank structure having a bottom wall 12 and circumscribing opposed front rear and side walls 13, 14 and 15 respectively. A body of liquid 16 having a liquid level 17 is adapted to be contained in the aquarium tank 11. Normally such aquariums 11 are adapted to accommodate various types of fish life, and generally such aquariums are provided with aerating means 18 for supplying oxygen to such tank in order to insure the necessary supply of oxygen to the fish contained therein. Normally, the aerating means 18 comprises an air nozzle 18A which is connected by a suitable supply conduit 19 to a conventional air pump or compressor (not shown) for supplying the air thereto. In such aquariums, the aerator operates continuously.

In accordance with this invention, means are provided for introducing an added interest to an aquarium tank 11, which not only renders the aquarium more interesting and attractive, but also functions as a means for indicating when the level of liquid in the tank has fallen below a proper predetermined level. Accordingly, such means comprises of a body means 20 which is adapted to rise and sink along a predetermined path in a continuous and regular rhythmic fashion. In the illustrated embodiment, as illustrated in FIGS. 1 to 3, the applicant's aquatic device comprises a guide means which in the illustrated embodiment comprises a pair of guide lines 21 disposed in parallel. One end of each line 21 is thereof anchored in the tank. In the illustrated embodiment, a simulated treasure chest 22 is utilized for anchoring the lower ends of the respective guide lines 21 in the tank by securing the same to the corners of the treasure chest 22.

Connected to the other end of the respective lines is a float 23 which is arranged so as to float along the surface 17 of the liquid. The length of the respective guide lines 21 is such that the floats 23 maintain the respective guide lines 21 in a substantially vertical taut position. The arrangement is such that in the event the level of the water 17 falls beneath the prescribed level, that the floats 23 accordingly will be lowered causing the respective guide lines 21 secured thereto to slacken. As will be hereinafter described, the slacking of the guide lines 21 will cause the operation of the device to be rendered inoperative. Consequently, upon the cessation of the operation of the device, an indication is had that the level of the water within the aquarium has fallen below the prescribed determined level.

Guided along the guide lines 21, in accordance with this invention is a body means 20. It is to be noted that the body means 20 may be shaped to assume any simulated object, thing or animal, as for example, a deep sea diver, skin diver, a fish, a submarine, underwater vehicle, or any other object fitting an underwater theme. In the illustrated embodiment, the hollow body 20 is formed to simulate the figure of a scuba diver in a swimming or diving position. It is to be noted that one hand 20A of the diver is outstretched and it is provided with a hole 24 therein through which one guide line 21 is threaded. The other hand 20B of the scuba diver is holding a spear 25 with the end of the spear being provided with a hole 26 through which the other guide line 21 is threaded. Thus the arrangement is such that the figure of the diver 20 is arranged so that it may be guided along the respective guide lines 21 in a rising and diving position as indicated in FIGS. 2 and 3.

The body of the figure, for the most part, is rendered hollow. In order to achieve balance of the particular figure 20 illustrated, a baffle means 27 closes off the respective arms at the shoulder portion from the rest of the hollow body portion, and the respective arms 20A, 20B of the diver 20 are provided with apertures 28 which permit the arm portions to be continuously flooded. In this manner the arms are balanced with respect to one another, and consequently the body of the figure is balanced along its longitudinal axis.

Formed in the under-surface of the body 20 is an enlarged opening 30 which provides an inlet thereto. Also formed in the body 20 at one or more locations is a smaller opening to define exhaust ports. In the illustrated embodiment, an exhaust port 31, 31 is formed in each of the feet portions. Another port 32 may be formed in the back portion. The respective body figure 20 is proportioned so that in its completely submerged position, as shown in FIGS. 1 and 2, the inlet opening 30 formed in the under-surface of the figure 20 is arranged to be disposed immediately adjacent the discharge end 18A of the aerator 18.

In operation, it will be apparent that the introduction of the air from the air nozzle 18A into the air inlet 30 of the body 20 will cause the air to bubble up through the liquid therein and become trapped within the body 20 of the figure as seen in FIG. 2. As the air becomes trapped within the body, an equal amount of water is exhausted therefrom through the respective exhaust ports 31, 32 as indicated by the arrows 33 in FIG. 2. When a sufficient amount of air has thus displaced a given amount of water, the body 20 of the figure is rendered buoyant and it will begin to automatically rise. Since the trapped portion of the air is located for the most part within the head and shoulder portions of the body, it will be apparent that the figure in rising will assume a natural rising or swimming position in surfacing. As the figure rises, small amounts of the air may be exhausted through the port opening 32, thus giving the indication the diver is actually breathing in ascending up to the surface.

When the figure has reached the surface, water is taken on through the inlet opening 30 thereof, causing the air rendering the body 20 buoyant to be displaced or exhausted through the port openings 31. Thus, when a sufficient amount of water has been taken in, the figure will begin to sink. Again, in sinking, the figure will assume a natural diving attitude causing the feet of the body to elevate as in FIG. 3, thereby allowing whatever air remaining to exhaust through ports 31 in the feet as the air will be displaced by the water entering through inlet 30. Accordingly the guide lines 21 will direct the figure 20 to the bottom of the tank so that when it has reached its lowermost position, the inlet opening 30 is again disposed immediately adjacent and over air nozzle 18A. The air introduced into the body will again effect displacement of the water therein and the body rendered buoyant again. Thus the cycle is repeated. Accordingly, the diver will rise and sink as long as the aerator is pumping air, and as long as the respective guide lines 21 are maintained sufficiently taut so as to guide the diver back to its initial position over the aerator nozzle 18.

In accordance with this invention, it will be noted that whenever the water reaches a level sufficiently below that which is required, the guide lines 21 will become slack. When the lines 21 slacken, they are rendered ineffective for guiding the diver 20 to its proper location over the nozzle 18A. When this occurs, the diver being offset from its alignment with respect to the aerating nozzle 18A will cause the operation of the body to cease. When this occurs, one becomes appraised that the liquid level has reached a point at which additional liquid should be introduced into the tank.

When water has been added to again raise the liquid level in the tank, line 21 again becomes taut, and the operation of the diver restarted. Because the water level of the tank falls due to natural evaporation, the evaporation or lowering of the liquid level is relatively slow in occurring. For this reason, the aquatic device described can be rendered operative over a considerable extended period of time, and depending on the size and shape of the tank can be rendered operative continuously for days and even weeks before the level of the liquid therein falls to a level wherein the lines are rendered sufficiently slack to interfere with the alignment of the air inlet opening 30 formed on the under-surface of the diver and the aerating nozzle 18A located on the bottom of the tank.

FIGURES 4 to 7 illustrate a modified form of the embodiment. This form of the invention, the aquatic device 40 is illustrated again as comprising a pair of guide lines and connected floats, as described with respect to FIG. 1, connected to a float 41A, and a hollow body means 42 threaded along the guide lines 41. In this form of the invention, the hollow body 42 is again illustrated as comprising a scuba diver, as described, provided with an inlet opening 43 in the lower surface thereof, and the one or more port means 44 formed along the upper surface thereof. In this arrangement, however, means are provided for maintaining or holding the body of the device submerged at the bottom of the tank even though it is rendered buoyant until the holding means is released by means of an actuator. In the illustrated embodiment, the holding means 45 comprises a magnetic means formed in the nature of a magnetic member 45A located in the bottom of the tank and a complementary magnetic means 45B connected to the underside of the figure 42. The arrangement is such that in its submerged position of the figure 42, the complementary magnetic means of the tank and under figure 45A, 45B are mutually attracted. Attraction between the respective complementary magnetic means 45A, 45B is such that it will normally overcome the buoyancy of the figure 42.

In operation, the inlet opening 43 of the figure, when submerged, is arranged so as to be in alignment with the aerator nozzle 46 for introducing air into the hollow body. In accordance with this form of the invention, an actuator means 47 in the form of a treasure chest 47A having a hinged lid 47B is provided. As seen, the lid 47B is free to swing between open and closed position.

Figure 5:
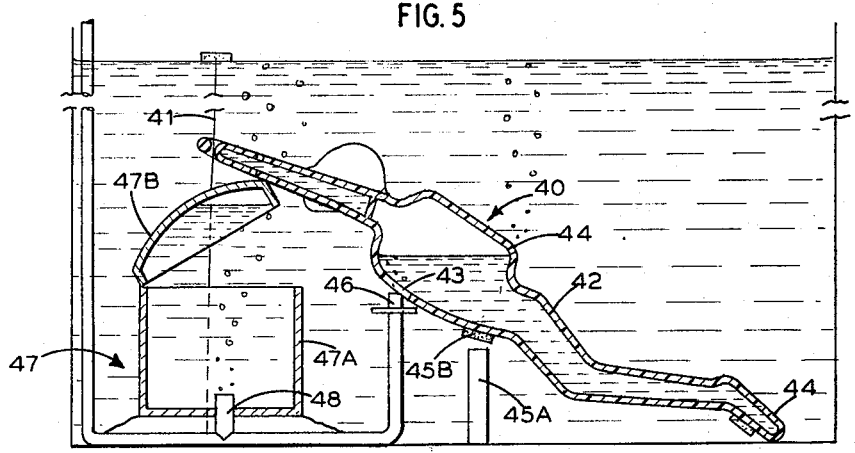
FIGURE 5 is a sectional side view of the modified embodiment of FIG. 4 illustrating the aquatic device in its position immediately upon the release and about to begin its ascent.
Figure 6:
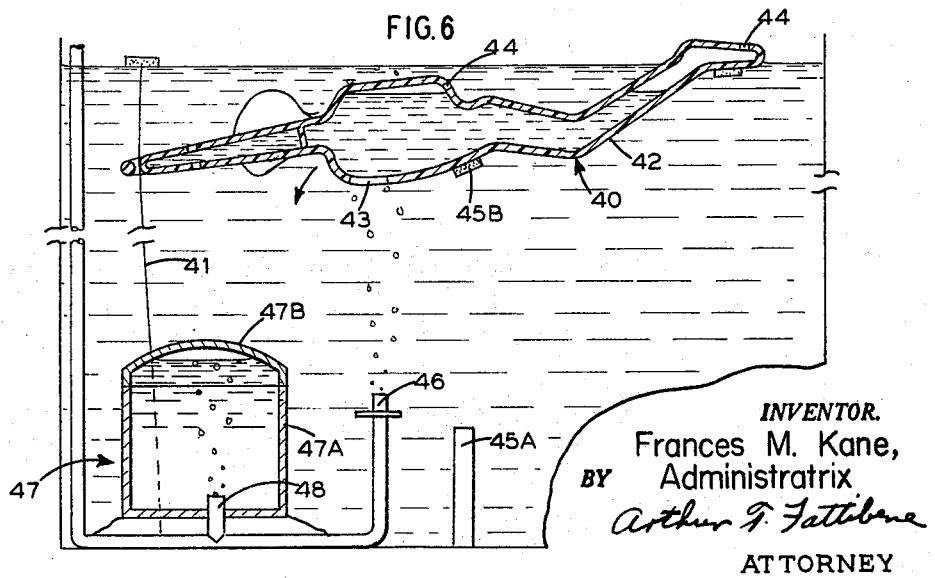
FIGURE 6 illustrates a side sectional view of FIG. 5, but illustrating the body of the aquatic device about to begin its descent.
Figure 7:
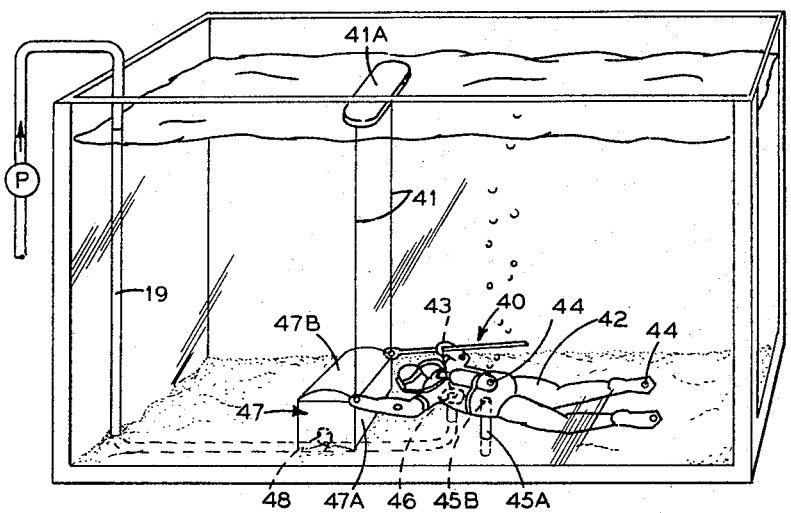
FIGURE 7 illustrates a perspective view of the embodiment of FIGS. 4 to 6.

As best seen in FIGS. 4 to 6, the aerator means is provided with a second nozzle 48 to introduce air into the chest 47A. It is to be noted that the lid 47B of the treasure chest 47A is sufficiently loose in its closed position thereof so as to permit the water therein to be displaced out through the line of demarcation between the lid 47B and the base 47A of the chest, as air is being introduced thereinto. In operation, when the pressure of the air within the chest becomes sufficiently great, it will cause the lid as seen in FIG. 3. In doing so, the lid will engage the outstretched portions of the diver, causing the magnetic attraction between the complementary holding means 45A, 45B to be broken. Since the body has been previously rendered buoyant by air from the nozzle 46, in a manner hereinbefore described, it will rise to the top of the liquid. Meanwhile the open lid 47B of the trunk causes the air pressure therein to be exhausted, and when this occurs the lid 47B of the trunk will fall closed by gravity. At which time air from nozzle 48 will begin accumulating within the trunk in preparation for repeating the cycle.

In the meantime, the diver having surfaced, begins to take in water through its opening 43, causing it to sink. In doing so, it attains its normal diving attitude with the feet end elevated as described with reference to FIGS. 1 to 3, and as shown in FIG. 6, and by means of the guide line 41 is again directed to a submerged position wherein the inlet opening 43 is again disposed adjacent the nozzle 46, and the magnetic attraction between the complementary holding means 45A, 45B again being rendered effective.

To operate, the timing of the air into the body of the figure 42 and into the chest 47, for effecting the operating of its lid, is such that the body of the figure 22 is rendered buoyant prior to the opening of the lid. This is readily attained by proper portioning of the size of the respective nozzles or by proper valving the same. If desired, an exhaust port 44 opening located in the back of the diver may be positioned so that when the body is rendered buoyant, but still in its holding position by magnetic means 45, the level of the liquid within the hollow figure 42 is disposed so that it is below the level of the port opening 44. In this manner, small amounts of air may be exhausted through the port opening 44 in the back to give the impression that the diver is breathing while submerged, and waiting for the lid 47B of the treasure chest 47 to open.

If desired, the hollow figure may be finely balanced by positioning of weights or cork, as desired, thereon so that the figure will assume normal diving attitudes. However, it is contemplated that the necessary balance can be readily built directly into the figure when it is made by proper design considerations.

From the foregoing, it will be noted that the novelty device is relatively simple in construction, and it can be readily fabricated from any suitable material, as for example, plastic, by molding or the like. Since aerators are normally an operating necessity of an aquarium, one need purchase only the hollow member and the guide lines to be anchored within the tank. If desired, however, aerators may be constructed and arranged as a set to include the guide lines and hollow figure threaded thereto.

From the foregoing, it will be noted that not only does the aquatic device form an intriguing and amusing adjunct for use in aquariums, but that it is also capable of functioning as a means for indicating proper water level. The construction of the device is such that it will operate over extended periods of time in a continuous and automatic manner without attention. By glancing at the aquarium, one can get an indication as to whether or not evaporation has caused the level of the water therein to fall below a desired datum.

While the invention herein has been described with reference to several embodiments thereof, it will be appreciated that variations and modifications thereof may be made without departing from the spirit or scope of the invention.

What is claimed is:
1. An aquatic device for continuously rising and submerging in rhythmic fashion within a body of water comprising
  (a) means defining a guide line,
  (b) means connected to said guide line for maintaining it taut in said body of water,
  (c) means defining a hollow body provided with an inlet formed on the undersurface of said body and an exhaust port spaced therefrom to effect control flooding of said hollow body to regulate the buoyancy thereof, said body having means for guiding said body along said guide means when placed in water,
  (d) and means located in said body of water in alignment with the inlet of said body in the submerged position of said body for introducing a lighter than water gas into said body through said inlet to render said body buoyant by displacing the water therein through said exhaust port so that said body will float toward the surface of said water along said guide means, and said body thereafter taking in water through said gas inlet whereby said air is exhausted through said exhaust port causing the same to submerge in position to again receive said gas to repeat the cycle, and said cycle ceasing when said guide line slackens.

2. The invention as defined in claim 1 wherein said body is independent of the means introducing the lighter than liquid fluid thereinto.

3. An aquatic device arranged to rise and submerge in a regular rhythmic fashion comprising
 (a) a guide line anchored in a body of water,
 (b) means for maintaining said guide line vertically taut in said body of water,
 (c) a hollow body,
 (d) means on said body through which said line is threaded whereby said body is free to rise and submerge in said body of water along said line,
 (e) said body having an inlet and an exhaust port of proportionate size to automatically control the buoyancy of said hollow body,
 (f) said inlet being formed in the undersurface of said body,
 (g) means for introducing a lighter than water fluid into said inlet when said body is in its submerged position whereby said fluid displaces an amount of water from said body sufficient to render said body buoyant thereby causing it to float to the surface along said line, and thereafter take in water through said inlet causing it to submerge along said line to a position for repeating the cycle.

4. The invention as defined in claim 3,
 (a) said means for maintaining said guide lines vertically taut comprising a float connected to said guide line to maintain said line taut to determine the prescribed path of said body, said float causing said line to slacken as the level of said body of water decreases, and whereby said slackening of the line effects a misguidance of said body which ceases the operation of the device.

5. An aquatic device arranged to rise and submerge in a body of water in a continuous rhythmic fashion comprising
 (a) a guide line anchored in a body of water,
 (b) a float connected to the free end of said guide line, said guide line being sufficiently long so that said float riding on the surface of water renders said line vertically taut,
 (c) a hollow body,
 (d) means on said body for freely guiding said body along said taut line when placed in said body of water,
 (e) an enlarged inlet opening formed on the undersurface of said body,
 (f) a series of exhaust ports extended through the surface of said hollow body,
 (g) a means located in said body of water for introducing air thereinto through said inlet opening of the body when in the submerged position of the body,
 (h) said body in the submerged position being positively guided by said taut line so that said inlet opening is disposed immediately above said air introducing means so that the air is received into said hollow body therethrough in the submerged position thereof, said air becoming trapped therein and causing the displacement of an equal volume of water therefrom through said exhaust ports,
 (i) said submerged body being then rendered buoyant when a sufficient amount of the water therein has been displaced so that it will rise to the surface along said line, and in the surfaced position said body gradually and automatically takes on water through said inlet causing said body to lose its buoyancy by effecting displacement of the air therein through said exhaust ports, and thereby sink to a position wherein its inlet is again disposed adjacent to said air introducing means to effect continuous repetition of the rising and sinking of said body on said guide line in a rhythmic fashion.

6. An aquatic device for indicating the level of a body of water comprising
 (a) a guide line anchored in a body of water,
 (b) a float connected to the free end of said guide line,
 (c) said float maintaining said line vertically taut in said body of water,
 (d) a hollow body,
 (e) means connected to said body through which said line is threaded whereby said body is free to rise and fall in said body of water along said line,
 (f) said body having an inlet formed in the undersurface thereof, and an exhaust port spaced therefrom,
 (g) means for bubbling air into said water,
 (h) said means including a discharge nozzle adjacent said guide line and,
 (i) said nozzle being positioned to discharge air into the inlet opening of said body in the submerged position of said body,
 (j) said body thereby becoming buoyant when a sufficient amount of air has displaced the water within said body at which time said body will gradually float to the top of said guide line at which point said body will take on water thus displacing the air which renders it buoyant and causes it to gradually sink, said guide line insuring re-positioning of the body so that its inlet opening is disposed in alignment with the air bubbling means to repeat the cycle as long as the guide lines are maintained taut and said bubbling means operating.

7. An aquatic device for indicating the water level, comprising
 (a) an anchored guide line,
 (b) a float connected to the free end of said guide line,
 (c) said float maintaining said line vertically taut in said body of water,
 (d) a hollow body,
 (e) an air means in said body of water,
 (f) means connected to said body through which said line is threaded whereby said body is free to rise and fall in said body of water along said line independent of said air means,
 (g) said body having an inlet formed in the undersurface thereof, and an exhaust port spaced therefrom,
 (h) said air means including a discharge nozzle,
 (i) said nozzle being positioned to discharge air into the inlet opening of said body in the submerged position of said body,
 (j) said body thereby becoming buoyant when a sufficient amount of air has displaced the water within said body at which time said body will gradually float to the top of said guide line at which time the body will take on water to displace the air therein causing it to gradually sink, and said guide line insuring re-positioning of the body so that its inlet opening is again disposed in alignment with the air nozzle whereby the cycle is repeated as long as the guide lines are maintained taut and the air means operating.

8. An aquatic device arranged to function as an indicator of proper water level as it rises and sinks in a body of water
 (a) a guide line anchored at one end in a body of water,
 (b) a float connected to the other end of said line for maintaining the same vertically taut in said body of water,
 (c) a hollow body means guided along said guide line for movement therealong as long as said line is maintained taut, (d) said body having an inlet opening and an exhaust port formed therein, said inlet opening being relatively larger than said exhaust port, (e) means for guiding said body along said guide line, (f) air means for introducing air into said water, said body being independent of said air means, (g) said inlet opening in said body being disposed so as to overlie said air means in the sunken position thereof whereby the air from said air means is introduced into said inlet and becomes trapped within said body to render it buoyant as the water therein is displaced through said port.

9. An aquatic device arranged to function as an indicator of proper water level as it rises and sinks in a body of water, a guide line anchored at one end in a body of water, a float connected to the other end of said line for maintaining the same vertically taut in said body of water, a hollow body means guided along said guide line for movement therealong as long as said guide line is maintained taut, said body having an inlet opening and an exhaust port formed therein, said inlet opening being relatively larger than said exhaust port, means for guiding said body along said guide line, air means for introducing air into said water, said hollow body being independent of said air means, a said inlet opening in said body being disposed so as to overlie said air means when said body is in the sunken position whereby the air from said air means is introduced into said inlet and becomes trapped within said body to render it buoyant as the water therein is displaced through said exhaust port, (a) means for holding said body submerged for a predetermined time after it is rendered buoyant, (b) said holding means including a magnetic means located in said body of water, and a complementary magnetic means located on said body whereby the magnetic attraction between said means is sufficient to overcome the buoyancy of said body, (c) and an actuating means to effect release of the magnetic holding means.

10. An aquatic device arranged to rise and fall in a rhythmic fashion in a body of water comprising, guide means adapted to be anchored in a body of water, a hollow body arranged to be guided along said anchored guide means, means for rendering said body buoyant when submerged in said body of water, means for positively holding said body immobile when said body is rendered buoyant, an actuating means rendered operative to render said holding means inoperative to effect release of said body after it is rendered buoyant so that said body is free to float toward the surface of the water, wherein said actuating means includes, (a) a hollow object having a hinged portion, (b) said hinged portion being adapted to swing between an open and closed position, (c) said body being disposed in its submerged position so an end portion thereof rests on said hinged portion in the closed position thereof, (d) means for introducing air in said object whereby the build up of air within the object effects pivoting of said hinged portion to open position, (e) and means for controlling the air introduction to said body and to said object so that said body is rendered buoyant prior to the opening of said hinged portion.

11. An aquatic device arranged to rise and fall in a rhythmic fashion in a body of water comprising, (a) guide means anchored in a body of water, (b) a hollow body having means for guiding said body along said guide means, said body having an inlet opening formed on the undersurface thereof and an exhaust outlet spaced therefrom, said inlet and outlet being of proportionate size to control the buoyancy of said body, (c) means for introducing a lighter than water fluid into the inlet of said body for rendering said body buoyant and non buoyant when placed in said body of water whereby said body moves between a lowered and raised position in a rhythmic fashion, (d) means for positively holding said body immobile when said body is rendered buoyant in the submerged lowered position, (e) and actuating means rendered operative to render said holding means inoperative to effect release of said body after it is rendered buoyant so that said body is free to float toward the surface of the water to its raised position.

12. An aquatic device arranged to function as an indicator of proper water level by rising and sinking in a body of water, (a) a pair of guide lines anchored at one end in a body of water, (b) a float connected to the other end of said lines for maintaining the same vertically taut in said body of water, (c) a hollow body means guided along said lines for movement therealong as long as said lines are maintained taut, (d) said body being shaped to simulate an object of a suitable underwater theme, (e) said body having an inlet opening formed in the undersurface thereof, and an exhaust port spaced therefrom, said inlet opening being relatively larger than said exhaust port, (f) means for guiding said body along said guide lines, (g) means for pumping air into said water, (h) said means including an air nozzle disposed adjacent said guide means, and (i) said inlet opening in said body being disposed so as to overly said nozzle in the sunken position thereof whereby the air from said nozzle is introduced into said inlet and becomes trapped therein to render said body buoyant as the water therein is displaced through said port, (j) means for holding said body submerged for a predetermined time after it is rendered buoyant, (k) said holding means including a magnetic means located in said body of water, and a complementary magnetic means located on said body whereby the magnetic attraction between said means is sufficient to overcome the buoyancy of said body, (l) and an actuating means to effect release of the magnetic holding means, (m) said actuating means including a pneumatic operating device which when rendered operative will break the attraction between said holding means causing said body to rise.

13. The invention as defined in claim 12 wherein said pneumatic actuating means includes (a) a hollow trunk having a hinged lid, (b) said lid being adapted to swing between an open and closed position, (c) said body when submerged being disposed so an end portion thereof rests on said lid in the closed position thereof, (d) means for introducing air in said trunk whereby the build up of air within the trunk effects pivoting of the lid to open position, (e) and means for controlling the air introduction to said body and to said trunk so that said body is rendered buoyant prior to the opening of said lid.

References Cited by the Examiner

UNITED STATES PATENTS

| | | | |
|---|---|---|---|
| 1,379,533 | 5/1921 | Cox | 114—53 |
| 2,836,927 | 6/1958 | Warner | 46—92 |

RICHARD C. PINKHAM, *Primary Examiner.*

F. B. LEONARD, *Assistant Examiner.*